United States Patent [19]

Chien et al.

[11] 4,278,510
[45] Jul. 14, 1981

[54] PLATABLE PROPYLENE POLYMER COMPOSITIONS

[75] Inventors: James C. W. Chien, Amherst, Mass.; Steven K. Evnochides; Joseph A. Howlett, both of Houston, Tex.

[73] Assignee: Gulf Oil Corporation, Pittsburgh, Pa.

[21] Appl. No.: 136,138

[22] Filed: Mar. 31, 1980

[51] Int. Cl.³ .................. C25D 5/56; C08K 3/04; C08K 3/06
[52] U.S. Cl. .................. 204/14 R; 204/20; 204/45 R; 252/511; 260/42.46
[58] Field of Search .................. 260/42.46; 252/511; 204/45 R, 14 R, 20

[56] References Cited

U.S. PATENT DOCUMENTS

| B 415,122 | 2/1976 | Henman et al. | 260/42.46 X |
|---|---|---|---|
| 3,416,992 | 12/1968 | Amos | 204/45 R X |
| 3,499,881 | 3/1970 | Poppe et al. | 260/42.46 X |
| 3,865,699 | 2/1975 | Luch | 204/20 |
| 3,962,157 | 6/1976 | Nakano et al. | 260/42.46 X |
| 4,002,595 | 1/1977 | Adelman | 260/42.46 X |
| 4,009,093 | 2/1977 | Luch | 204/291 |
| 4,101,385 | 1/1978 | Luch | 204/20 |

*Primary Examiner*—G. L. Kaplan
*Attorney, Agent, or Firm*—Richard L. Kelly

[57] ABSTRACT

Propylene polymer compositions that are easily plated with metals to provide strongly adherent coatings are provided. Typically, such compositions consist essentially of:

a. 100 parts by weight of a propylene polymer,
b. 20–150 parts by weight of an electrically conductive carbon black,
c. 0.2–2.5 parts by weight of sulfur and
d. 0.5–10 parts by weight of a maleic anhydride-modified propylene polymer.

6 Claims, No Drawings

PLATABLE PROPYLENE POLYMER COMPOSITIONS

BACKGROUND OF THE INVENTION

There is growing interest in preparing molded polymer articles bearing thereon electrodeposited metal coatings. Such articles are desired particularly as trim parts in the manufacture of automobiles. Examples of patents indicating such interest include U.S. Pat. No. 3,523,875; 3,682,786; 3,865,699; 4,009,093; and 4,101,385.

The development of polymer compositions that can be electroplatable presents formidable problems to the polymer art. This results from the fact that most polymers do not conduct electricity, while the metal plating of an article requires that an electric current be passed through the article to be plated.

Partially satisfactory answers to the above-noted problems have been developed by either depositing an electrically conductive coating on the polymer article to be plated, or by dispersing a conductive material in the polymer part to be plated, or both. While limited successes have been obtained by such techniques, difficulties still are encountered in depositing firm, adherent metal coatings to polymer parts, even when employing the best techniques presently known in the art.

Accordingly, there remains a need in the art for polymer compositions which can be readily electroplated so as to provide strongly adherent metal coatings to the polymer substrate.

SUMMARY OF THE INVENTION

The applicants have discovered certain polymer compositions based on propylene polymers which can be readily electroplated employing conventional plating techniques. The metallic coatings laid down on such compositions adhere strongly to the polymer substrate. The polymer compositions of the invention consist essentially of about 100 parts by weight of a propylene polymer, a quantity of an electrically conductive carbon black sufficient to reduce the electrical resistivity of the composition to less than about 1,000 ohm-centimeters, a minor quantity of sulfur or a sulfur donor sufficient to increase the rate of metal deposition on the polymer, and a minor quantity of a maleic anhydride-modified propylene polymer sufficient to improve the adhesion of the plated metal to the polymer.

DETAILED DESCRIPTION OF THE INVENTION

The propylene polymer included in the compositions of the invention can be essentially any isotactic propylene polymer of the type sold for molding purposes. Such polymers can be a propylene homopolymer, a random propylene-ethylene copolymer, a propylene-ethylene block copolymer, and the like. Frequently an elastomer will be blended with the propylene polymer to improve its impact strength, particularly at subambient temperature. The elastomer employed for this purpose can be of any type conventionally employed for such purposes with propylene polymer compositions, including terpolymers of propylene, ethylene, and a nonconjugated diene such as hexadiene, dicyclopentadiene and the like. In addition, other polymers such as ethylene polymers optionally may be blended with the propylene polymer to modify certain of its properties. Where such blends are employed as the propylene polymer component of the compositions of the invention, the propylene polymer will constitute at least 50 and preferably at least 70 weight % of such blend.

The carbon black included in the compositions of the invention can be any of the commercially available conductive and semiconductive carbon blacks. Frequently such conductive carbon blacks are characterized as being acetylene carbon blacks. Typical suitable carbon blacks are those sold by Shawingan Products Corporation under the trade designation "Acetylene Carbon Black" and the materials sold by Cabot Corporation under the trade designation "Vulcan XC-72."

The quantity of carbon black included in the polymer compositions of the invention should be sufficient to reduce the volume resistivity of the part to be plated to be less than about 1,000 ohm-centimeters, and more preferably less than about 10 ohm-centimeters. The quantity of carbon black required to develop such volume resistivities will depend principally upon the characteristics of the carbon black employed, and to a somewhat lesser extent the manner in which the carbon black is compounded and dispersed throughout the polymer composition. Typically, the carbon black will be employed in amounts of 20-150 parts and more especially about 35-100 parts per 100 parts of the propylene polymer included in the compositions.

The sulfur included in the compositions of the invention can be either the conventional elemental sulfur of commerce, or a material which under the conditions of use will function as a donor of nonionic sulfur. Suitable sulfur donors include sulfur chloride, 2-mercapto-benzothiazole, N-cyclohexyl-2-benzothiozole sulfonomide, dibutyl xanthogen disulfide, tetramethyl thiuram disulfide, dipentamethylenethiuram hexasulfide, and the like. It will be recognized that the compounds set forth above are accelerators used in rubber industry, and essentially any compound which functions as such an accelerator will function as a sulfur donor in the compositions of the invention.

The quantity of sulfur included in the compositions of the invention will be sufficient to increase the rate of metal deposition on the polymer composition in an electroplating cell. Consequently, the quantity required will be importantly influenced by the plating weight desired on the article being plated, together with the conditions employed in the plating bath. Typically, concentrations of from 0.2-5.0 and more especially 0.5-3.0 parts per 100 parts of propylene polymer are suitable. The quantities set forth above are those to be employed when the sulfur or sulfur donor is uniformly dispersed throughout the polymer composition. In an optional embodiment of the invention, the sulfur or sulfur donor may be dispersed on the surface of the propylene polymer article to be plated. In this embodiment, the concentration of the sulfur, based on the total weight of the propylene polymer, can be reduced significantly below the limits expressed above.

The maleic anhydride-modified propylene polymer included in the compositions of the invention are known compositions disclosed in Belgian Pat. No. 607,269 and British Pat. No. 1,101,408; the disclosures of which are incorporated herein by reference. These polymers will contain about 0.1-5.0, preferably about 0.5-4.0, and more especially about 3.0-4.0 weight % of chemically combined maleic anhydride. The polymers are prepared by heating maleic anhydride and a propylene polymer in an inert solvent in the presence of a free radical generating polymerization initiator. More detailed descriptions of procedures for preparing such modified polymers are set forth in British Pat. No. 1,101,408 previously incorporated herein by reference. As maleic anhydride will not homopolymerize by free radical initiation, it is believed that the modified polymers contain, along the propylene polymer chains, a plurality of groups of the structure:

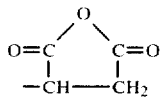

Such groups will be attached to the propylene polymer chain at sites where a hydrogen atom has been abstracted by the free radical generating polymerization initiator. The propylene polymer employed in the preparation of the maleic anhydride-modified propylene polymers can be any solid propylene polymer, either crystalline or amorphous, containing active centers or sites which are capable of anchoring the maleic anhydride thereon. The preferred propylene polymers from which the maleic anhydride-modified polymers are made for use in the invention are stereoregular polypropylene, amorphous polypropylene and copolymers of propylene and ethylene. These modified polymers desirably have a reduced specific viscosity of about 0.5–5.0, as measured in decahydronapthalene at 135° C.

The maleic anhydride-modified propylene polymer functions to promote the adhesion of the plated metal to the propylene polymer substrate. Accordingly, the quantity required is somewhat dependent upon both the bond strength required in the finished plated article and the weight % of combined maleic anhydride contained in the maleic anhydride-modified propylene polymer. For most applications, the compositions of the invention should contain about 0.1–5.0 and preferably about 0.5–4.0 parts by weight of the maleic anhydride-modified propylene polymer for each 100 parts of the propylene polymer component.

The methods employed for plating a metal on the propylene polymer compositions of the invention will be essentially similar to the methods presently employed for plating metals on propylene polymer compositions as more fully described in U.S. Pat. No. 3,865,699; the descriptions of which are incorporated herein by reference. The method can be employed to plate any conventional type of metal on the substrate, but customarily is employed to plate the metals of Group VIII of the Periodic Table of Elements, and particularly iron, nickel, and cobalt. As a typical example, nickel can be plated onto the propylene polymer compositions from a plating bath containing about 60 to about 125 grams per liter of nickel ion, with the plating bath being buffered at a pH in the range of about 2.8 to about 4.5. The current density imposed also will be within the conventional range which typically is about 25–100 amps/ft².

Frequently it will be desirable to electroplate a series of metals onto the propylene polymer substrate in a series of plating operations carried out in sequence. Typically, to prepare an article bearing a chromium plate, the substrate initially will be plated with nickel, optionally with a second metal such as copper, with a bright nickel plate, and finally with chromium. Such multiple plating operations and the value thereof are known in the art.

Although a metal such as nickel can be electroplated directly on the propylene polymer compositions previously described, the rate at which the substrate can be plated frequently can be improved by applying a supplemental sulfur coating onto the part to be plated by a dip-coating operation. For example, before plating, beneficial results frequently are obtained by dipping the part to be plated in a bath having elemental sulfur dissolved or dispersed in an organic solvent such as tetrahydrofuran.

The following examples are set forth to illustrate more clearly the principle and practice of the invention to those skilled in the art. Where parts or percentages are set forth, they are parts and percentages on a weight basis, unless otherwise specified.

EXAMPLE 1

Part A

A series of propylene polymer compositions having the compositions shown in Table I were prepared. The propylene polymer was first fluxed in a Brabender plasticorder operated at an oil temperature of 190° C. The remaining components then were added and the composition was fluxed for 5 minutes. A control typical of a commercial prior art platable propylene polymer composition was prepared in the same manner. The control formulation contained 100 parts of the propylene polymer, 48 parts of the conductive carbon black, 0.32 part of elemental sulfur, 0.32 part of benzothiazyl disulfide (a sulfur donor) and 6.0 parts of zinc oxide.

TABLE I

| Component | Composition No. | | | | | | | | |
|---|---|---|---|---|---|---|---|---|---|
| | 1 | 2 | 3 | 4 | 5 | 6 | 7 | 8 | 9 |
| Propylene Polymer (a) | 100 | 100 | 100 | 100 | 100 | 100 | 100 | 100 | 100 |
| Acetylene Carbon Black (b) | 56 | 56 | 56 | 56 | 56 | 56 | 56 | 56 | 56 |
| Elemental Sulfur | — | — | — | — | — | 2.4 | 2.4 | 2.4 | 2.4 |
| Maleic Anhydride-Modified Propylene Polymer (c) | 2.4 | 3.2 | 4.0 | 6.0 | 8.0 | 2.4 | — | 4.0 | 6.0 |

(a) Molding grade high impact resin containing 75 wt. % of isotactic propylene homopolymer, 12.5% of high density ethylene homopolymer and 12.5 wt. % of an ethylene propylene elastomer.
(b) Vulcan XC-72 supplied by Cabot Corporation.
(c) Prepared by the process disclosed in British patent 1,101,408 and containing about 3.5 wt. % chemically combined maleic anhydride.

Part B

Sample discs ⅛" thick and 1½" in diameter were compression molded from each of the formulations of Part A.

Part C

Each disc prepared in Part B, after weighing, was dipped in deionized water and employed as the cathode in a laboratory electroplating apparatus. Nickel was plated onto the discs from a Watts plating bath containing 9.3 oz./gallon of nickel ion, 35.4 oz./gallon of sulfate ion, 5.6 oz./gallon of chloride ion and 5.0 oz./gallon of borate ion. The plating cycle was 1 minute at 0.5 volt, 1 minute at 1.5 volt, and 2 minutes at 2.5 volts. The plated discs were washed with distilled water, air-dried, and weighed.

An identical series of platings were run on discs that were first dipped in a bath containing 1% of sulfur dissolved in tetrahydrofuran.

The adhesion of the nickel plate to the polymer substrate was determined by a "Scotch Tape" test. In this procedure, the plated samples are allowed to condition at room temperature for a minimum of 24 hours after the plating process is complete. At the end of that time, a piece of Scotch brand invisible tape is firmly adhered to the surface of the plated disc in such a way that it bisects the disc. After waiting one minute, the tape is jerked sharply upward at right angles to the part surface. The part, whose plated weight is known, is reweighed to determine the amount of plating lost to the tape. A visual inspection is made to insure that submilligram quantities have not been removed in this test.

The test results are set forth in Table II.

TABLE II

| Composition No. | 1 | 2 | 3 | 4 | 5 | 6 | 7 | 8 | 9 | Prior Art Control |
|---|---|---|---|---|---|---|---|---|---|---|
| Uncoated Samples | | | | | | | | | | |
| Weight of nickel deposited, gms. | 0.0093 | 0.0082 | 0.0086 | 0.0069 | 0.0082 | 0.0278 | 0.0314 | 0.0133 | 0.0255 | 0.0070 |
| Weight of nickel removed in tape test, gms. | 0 | 0 | 0 | 0.0001 | 0.0002 | 0.0002 | 0.0039 | 0 | 0 | 0.0008 |
| Sulfur Coated Samples | | | | | | | | | | |
| Weight of nickel deposited, gms. | 0.0148 | 0.0162 | 0.0186 | 0.0260 | 0.0210 | 0.0259 | 0.0337 | 0.0202 | 0.0287 | 0.0196 |
| Weight of nickel removed in tape test, gms. | 0 | 0 | 0 | 0 | 0 | 0 | 0.0027 | 0 | 0 | 0.0026 |

By reference to the data for Compositions 1–5, the plated nickel is bonded well to the plated discs. These data demonstrate the value and function of the maleic anhydride-modified propylene polymer in improving the bonding of the metal plate to the substrate. The weight loss in these tape tests should be compared with the corresponding data for Composition 7 and the Prior Art Control which do not contain the maleic anyhdride-modified propylene polymer.

The weight of nickel plated on Compositions 1–5 was undesirably low, but was increased significantly by dip coating the plating discs in the sulfur solution.

The Compositions 6, 8 and 9 gave excellent coating weights with essentially no loss of plate in the tape test.

EXAMPLE 2

At a date subsequent to the work reported in Example 1, Composition 10 was prepared as an exact duplicate of Composition 8 and Composition 11 was prepared as an exact duplicate of Composition 9. The new compositions were evaluated as in Example I to demonstrate the reproducibility of the experimental results. The test results shown in Table III below are in good agreement with corresponding data of Table II.

TABLE III

| Composition No. | 10 | 11 |
|---|---|---|
| Uncoated Samples | | |
| Weight of nickel deposited, gms. | 0.0275 | 0.0154 (a) |
| Weight of nickel removed in Tape Test, gms. | 0 | 0 |
| Sulfur Coated Samples | | |
| Weight of nickel deposited, gms. | 0.0236 | 0.0237 |
| Weight of nickel removed in Tape Test, gms. | 0 | 0 |

(a) This weight is believed to be anomalous and lower than the actual weight of the metal deposited.

EXAMPLE 3

Two compositions similar to the compositions of the invention were prepared except that the maleic anhydride-modified propylene polymer was replaced with an equimolar copolymer of hexene-1 and maleic anhydride. The formulations and test data are shown in Table IV.

TABLE IV

| Composition No. | 12 | 13 |
|---|---|---|
| Component | | |
| Propylene Polymer | 100 | 100 |
| Acetylene Carbon Black | 56 | 56 |
| Sulfur | 8 | 8 |
| Hexene-maleic Anhydride Copolymer | 4 | 6 |
| Plating Test Results | | |
| Uncoated Samples | | |
| Weight of nickel deposited, gms. | 0.0366 | 0.0385 |
| Weight of nickel removed in tape test, gms. | 0.0043 | 0.0023 |
| Coated Samples | | |
| Weight of nickel deposited, gms. | 0.0399 | 0.0408 |
| Weight of nickel removed in tape test, gms. | 0.0027 | 0.0015 |

The compositions shown in Table IV are unsatisfactory by reason of the large metal losses in the tape tests. These data indicate that maleic anhydride copolymers are not functional equivalents of the maleic anhydride-modified propylene polymers in the compositions of the invention.

We claim:

1. A propylene polymer composition having the characteristic of being readily electroplatable with a metal such as nickel to provide a strongly adherent metal coating; said composition consisting essentially of about 100 parts by weight of a propylene polymer, a quantity of electrically conductive carbon black sufficient to reduce the electrical resistivity of the composition to less than about 1,000 ohm-centimeters, a minor amount of sulfur, of a sulfur donor, sufficient to increase the rate of metal deposition on the polymer, and a minor amount of maleic anhydride-modified propylene polymer sufficient to improve the adhesion of the plated metal to the polymer; said maleic anhydride-modified propylene polymer containing about 0.1 to 5 weight % chemically combined maleic anhydride and having been prepared by heating a propylene polymer and maleic anhydride in an inert solvent in the presence of a free radical generating polymerization initiator; said sulfur donor being selected from the group consisting of sulfur chloride, 2-mercapto-benzoithiazole, N-cyclohexyl-2-benzothiozole sulfonomide, dibutyl xanthogen disulfide, and dipentamethylene-thiuram hexasulfide.

2. A composition of claim 1 containing about:
   a. 100 parts by weight of said propylene polymer,
   b. 20-150 parts by weight of said electrically conductive carbon black,
   c. 0.2-5.0 parts by weight of said sulfur or sulfur donor, and
   d. 0.5-10 parts by weight of said maleic anhydride-modified propylene polymer.

3. A composition of claim 1 containing about:
   a. 100 parts by weight of said propylene polymer,
   b. 35-100 parts by weight of said electrically conductive carbon black,
   c. 0.5-3.0 parts by weight of said sulfur or sulfur donor, and
   d. 1.0-6.0 parts by weight of said maleic anhydride-modified propylene polymer.

4. A composition of claim 1, 2, or 3 in which said maleic anhydride-modified propylene polymer contains about 0.5-4.0 weight % chemically combined maleic anhydride.

5. A composition of claim 1, 2, or 3 in which said maleic anhydride-modified propylene polymer contains about 3.0-4.0 weight % chemically combined maleic anhydride.

6. In a process for depositing a metal from an electroplating bath onto an article fabricated from a propylene polymer composition in which the article to be plated is employed as the cathode in a metal plating bath and an electric current is applied across the plating bath; the improvement which consists essentially of employing as the propylene polymer composition the propylene polymer composition of claim 1, 2 or 3.

* * * * *